United States Patent [19]
McKelvey

[11] Patent Number: 5,785,419
[45] Date of Patent: Jul. 28, 1998

[54] LIGHTWEIGHT BUILDING MATERIAL AND METHOD OF CONSTRUCTION OF CAST-IN-PLACE STRUCTURES

[76] Inventor: Paul A. McKelvey, 1906 Canyon Rd., Redlands, Calif. 92373

[21] Appl. No.: 541,608

[22] Filed: Oct. 10, 1995

[51] Int. Cl.$^6$ ........................................... B28C 5/34
[52] U.S. Cl. ................... 366/6; 366/35; 366/50; 106/705; 106/DIG. 1
[58] Field of Search ................... 366/1, 2, 3, 6, 366/27, 28, 30, 33, 35, 36, 38, 50, 348, 349, 56–59, 186; 106/703, 239, 756, 767, 679, DIG. 1, 705

[56] References Cited

U.S. PATENT DOCUMENTS

| | | | |
|---|---|---|---|
| 1,191,673 | 7/1916 | Davis | 366/186 X |
| 1,607,713 | 11/1926 | Wickey | 366/50 X |
| 2,366,673 | 1/1945 | Paley | 366/186 X |
| 3,118,656 | 1/1964 | Witt | 366/1 |
| 3,612,491 | 10/1971 | McKillop et al. | 366/59 X |
| 3,901,485 | 8/1975 | Schwing | 366/50 |
| 4,358,205 | 11/1982 | Eakins | 366/186 X |
| 4,395,128 | 7/1983 | Mathis et al. | 366/50 X |
| 4,518,262 | 5/1985 | Bornemann et al. | 366/186 X |
| 4,548,507 | 10/1985 | Mathis et al. | 366/50 X |
| 4,896,968 | 1/1990 | Baillie | 366/50 X |
| 5,196,061 | 3/1993 | Thomas et al. | |
| 5,203,628 | 4/1993 | Hamm | 366/2 |
| 5,240,324 | 8/1993 | Phillips et al. | 366/186 X |
| 5,472,499 | 12/1995 | Crocker | 106/DIG. 1 |
| 5,484,480 | 1/1996 | Styron | 106/DIG. 1 |

OTHER PUBLICATIONS

Faswell Building Systems, Insulating Wall Forms for Reinforced Concrete Structures, product brochure (No date).

Sparfil International Inc., The Sparfil Block & Wall System, product brochure (No Date).

Sparfil Blok Florida, Inc., Sparfil Insulated Block product brochure (No Date).

The Cutting Edge, "From Six-Pack Packaging to New Homes," Cockfield, Jr., Los Angeles Times, Nov. 2, 1994.

Gridcore Systems International product brochure (No Date).

Louisiana-Pacific product brochure (No Date).

Hub Construction Specialities, Inc., Fastest Form Hanger product brochure (No Date).

Hebel Southeast, Shaping the Evolution of Building, 1994 product brochure (No Date).

Hebel Southeast, Hebel produces results, 1994 product brochure (No Date).

Hebel Southeast, A Hebel Wall Step, 1994 product brochure (No Date).

Munsell, W., "Stay-in-place Wall Forms Revolutionize Home Construction," Concrete Construction, 40(1):12–10, (1995).

(List continued on next page.)

Primary Examiner—Charles E. Cooley
Attorney, Agent, or Firm—Lyon & Lyon LLP

[57] ABSTRACT

In a first aspect, a lightweight building material for use in above grade construction comprising cement, fly ash, cellulose fiber, and water. In cured form, the material has the appearance and strength of standard concrete, but is lighter in weight and has preferable thermal properties. The material is capable of being sanded, chiseled, drilled, sawed, nailed and bolted in a manner similar to like operations with wood. In a second, separate aspect, the lightweight building material is manufactured into a lightweight aggregate material suitable for use in the construction of pre-cast objects, such as, for example, construction blocks. In a third, separate aspect, a method of manufacturing a lightweight aggregate material includes the steps of providing a lightweight building material in wet pulp form, adding one part of wet pulp to three or more parts of dry aggregate, and mixing the wet pulp and dry aggregate in a mixing screw conveyor. In a fourth, separate aspect, an adjustable masonry wall and foundation jig is used to construct a monolithic footing and slab. In a fifth, separate aspect, a method of construction of cast-in-place structures comprises suspending a form apparatus over footings and pouring a building material between forms of the apparatus.

4 Claims, 9 Drawing Sheets

OTHER PUBLICATIONS

C.T.S.–Conform, The One–Step Insulating Formwork, 1990 product brochure (No Date).

Ener–Grid, Build–All, product brochure (No Date).

Durand Equipment & Mfg. Co., Aluminum Wall Forming Sytem product brochure (No Date).

International Permalite Inc., 1991 product brochure (No Date).

VanderWerf, P. Et al., The Portland Cement Association's Guide to Concrete Homebuilding Systems, McGraw–Hill, Inc. (1995) (No Date).

LIGHTWEIGHT BUILDING MATERIAL AND METHOD OF CONSTRUCTION OF CAST-IN-PLACE STRUCTURES

FIELD OF THE INVENTION

The field of the invention is above grade building materials, materials for use in the production of pre-cast objects, and methods of construction.

BACKGROUND OF THE INVENTION

The residential and commercial construction industry represents a significant part of the economy and way of life in the contemporary United States. People rely on having homes and businesses that are safe, durable, attractive and constructed of materials that provide all of these qualities. Accordingly, the industry has relied on several building materials and methods that have proven effective over the course of time.

Most modern residential and commercial buildings are primarily constructed of wood, concrete, steel, or some combination of the three. Each of these materials has desirable properties, such as strength, durability, and flexibility of use. In particular, wood is a desirable building material because it is easily cut, sanded, chiseled and drilled to accommodate almost any shape and application. Concrete is a strong, durable and price stable building material that is particularly useful in the construction of flooring, footings and other foundational elements. Steel is also useful due to its relatively light weight, strength, uniform quality and price stability.

Wood-frame construction predominates as the method used in the construction of residential structures today, particularly in the western United States. In wood-frame construction, a concrete foundation is poured first, followed by construction of a wood framework that is attached to the foundation after the concrete cures. Rough plumbing, electrical, mechanical, insulation, and the like are then installed within the framework. The framework is then finished by affixing surface components to the wall, floor, and ceiling framework. For example, drywall may be used to make up interior surfaces of walls and ceilings, stucco or some other finish coat may be used to provide an exterior surface for walls, and plywood sheets may be used to provide floor surfaces. The resulting residential structure is attractive, functional, and is easily re-modeled or added to.

Light gauge steel frame structures are built in a manner similar to that of wood frame construction. Light gauge steel studs are utilized in place of wood studs, and the framework is constructed similarly to that in wood-construction, except that different tools and fasteners are used. Light gauge steel construction is gaining popularity in residential and light commercial construction, primarily due to increasing lumber prices. Additionally, steel does not burn and is not susceptible to termite damage or organic decay as is wood, thus providing steel with several advantages over wood as a building material of choice.

Alternatively, some structures are built using concrete as a building material. Concrete construction generally involves pouring concrete in its liquid or plastic state into a space between solid forms defining the shape of the desired concrete structural element such as a wall, floor, ceiling, or roof panel. The element is either cast in place or pre-cast and craned into location after it has sufficiently cured. Cast in place concrete construction is a relatively expensive method of construction, primarily due to the high labor and material costs of assembling a usable form apparatus. Pre-cast concrete construction has the advantage of lower forming cost, but the disadvantage of increased transportation and erection costs.

The choice of building material and method of construction for a particular use is dependent on several factors. The primary considerations affecting the choice are materials and labor costs, durability of the finished structure, attractiveness, flexibility and adjustability of the finished structure and structural elements, and ease of use of the material and method. For these reasons, wood and wood-frame construction predominate in application to residential construction. Wood is particularly suited for use in construction because it is versatile and easy to use. A wood-frame structure is also easily re-modeled as discussed above, adding to the desirability of using wood as a building material.

However, those skilled in the art will appreciate that there are several disadvantages inherent in wood-frame construction. In particular, wood lacks the structural strength of materials such as concrete, and wood-frame structures are therefore less durable than concrete structures. Wood-frame structures are therefore more susceptible to damage caused by natural forces, such as the gradual wear and tear caused by the elements or sudden forces such as shaking during earthquakes and high wind loads during hurricanes. A wood-frame structure also suffers from the fact that it is constructed about a skeletal frame rather than being unitarily constructed of solid material, resulting in wood-frame walls having poor acoustic and thermal properties, and requiring the addition of insulation to meet building code standards.

Moreover, wood itself has many undesirable material properties in its use as a building material. In particular, wood is flammable, and fire destroys thousands of wooden residential structures each year. Wood is also susceptible to dry-rot and infestation by termites. These and other limitations reduce the economic attractiveness of using wood as a building material in residential and commercial structures.

As an alternative, concrete provides many properties that wood lacks. In particular, concrete is non-flammable and is not susceptible to dry-rot or termite damage. Concrete structures also comprise solid walls, and therefore are extremely sound-resistant. A concrete structure is very durable, and is able to be constructed in such a way as to be extremely earthquake and wind resistant. Monolithic cast-in-place concrete structures are particularly strong, and this construction method is frequently used in the construction of retaining walls, culverts, bridges and highways. And while concrete is not easily re-modeled or re-shaped after curing, concrete in its plastic form is able to be poured into many shapes and sizes. Concrete is also relatively price stable, although concrete construction remains relatively expensive in relation to wood construction due primarily to higher relative labor costs.

However, as those skilled in the art will also appreciate, concrete is also limited in its use as a construction material. Cured concrete is extremely limited in its ability to be re-modeled or adjusted after construction has been completed. Concrete is not easily sanded, chiseled, drilled, nailed or bolted as is wood, therefore finished structural elements of concrete do not provide surfaces that are capable of being finished in the manner that a wood-frame structure might. A concrete structure therefore typically resembles a "bunker" in look and feel—i.e. the structure is strong and solid, but is unattractive and not easily shaped and molded to its environment. The high forming cost of cast in place concrete construction has also placed a limit on the use of this construction method for residential and light commercial use.

Concrete block structures combine the strength of concrete with the flexibility of wood frame. Though block structures are not as strong as cast concrete, and block construction is not as flexible as wood framing, concrete block construction combines several of the advantages of the other two. For example, the cost to build a block structure is typically less than a comparable cast concrete structure, but more than a comparable wood frame structure. Additionally, concrete block structures offer many of the performance and structural qualities such as strength, durability, and similar qualities to those of cast concrete that make cast concrete superior to wood framing.

However, concrete block construction continues to represent only a small percentage of the homes built around the United States due primarily to price and inability to provide the architectural details that home buyers have come to expect. Further, the methods used to construct the foundations supporting block structures remain the same as they have been for years. In block construction, there is little room for error when setting and leveling forms, placing reinforcing steel, locating the rough plumbing, electrical, etc. Once the foundation is poured it is a difficult task to relocate a misplaced item. Accordingly, experienced contractors know the value of using skilled tradesmen to coordinate and build the foundation of a concrete block structure. Even where one invests the added time and expense of carefully constructing the foundation, corrections and adjustments are not uncommon after the concrete foundation is poured.

An additional factor influencing the choice of building materials and construction methods is the increased recent attention being directed to environmental concerns. Although wood is a renewable resource, there are concerns that have arisen that this valuable resource is being overly taxed by the demands of the construction industry. These concerns, along with concerns for endangered species using timberlands as a habitat have prompted governmental restrictions on the timber industry, which have contributed to volatile and ever increasing prices for lumber. These same concerns have prompted growing efforts to recycle wood and wood products in order to reduce demand and get more usable product from each harvested tree.

Additional recent attention has been directed to the increasing amounts of waste being disposed of in landfills. Some studies indicate that a significant portion of this waste consists of residential and commercial construction waste. Accordingly, there has existed a need for improved building materials and methods of construction that depend less heavily on the lumber industry and that result in a reduced amount of construction waste.

A still further consideration in choice of building material and construction method is energy efficiency. Energy efficiency and building code compliance are major concerns to those in the building industry. Energy efficient structures are not only required by increasingly stringent building codes, but are being requested more frequently by consumers and promoted by utility companies.

Accordingly, there exists an ever-increasing need for improved building materials and methods of construction that depend less heavily on the lumber industry, that shift toward the use of recycled materials, that reduce the amount of construction waste, and that increase energy efficiency. These needs must also be considered in the context of consumer demands that structures be safe, durable, attractive and inexpensive.

SUMMARY OF THE INVENTION

The present invention is directed to lightweight building materials, methods of manufacturing a lightweight aggregate material, methods of constructing masonry structures, and methods of construction of cast-in-place structures.

In a first, separate aspect of the present invention, a lightweight building material comprises a mixture including a cellulose fiber material, one or more cementitious binding agents, and potable water.

In a second, separate aspect of the present invention, a method of manufacturing a lightweight aggregate material includes the steps of mixing together the components of a lightweight building material, compressing the mixture to remove excess water and to form a cake-like material, crumbling the cake-like material into pellets, and curing the pellets. The lightweight aggregate material so prepared is suitable for use in the manufacture of pre-cast objects, such as construction blocks or the like.

In a third, separate aspect of the present invention, a method of manufacturing a lightweight aggregate material includes the steps of providing a lightweight building material in wet pulp form and mixing the wet pulp material with previously crumbled and cured material of the same composition. The lightweight aggregate material so prepared is suitable for use in the manufacture of construction blocks.

In a fourth, separate aspect of the present invention, an adjustable masonry wall and foundation jig is used to construct a monolithic footing and slab. The masonry wall and foundation jig comprises a pair of light steel rails supporting a course of blocks above a footing trench. The light steel rails are adjustably suspended over the trench by a plurality of screw stakes. The jig serves to simultaneously define the wall layout of the structure and to provide a forming system for the foundation. Once the first course of blocks is located the blocks are used to jig into location all of the internal wall and foundation components. A construction method utilizing the masonry wall and foundation jig is uniquely adapted to take advantage of current technology in computer aided design (CAD) by providing the capability to deliver to the job site modular jig components that assemble into the exact footprint of the structure to be constructed.

In a fifth, separate aspect of the present invention, a method of construction of cast-in-place structures includes the steps of erecting a framework to support structural forms, hanging a first form, attaching block-outs to the first form, hanging a second form, and pouring the building material. The method of construction is similarly uniquely adapted to take advantage of current technology in computer aided design (CAD).

Accordingly, an object of this invention is to provide improved lightweight building materials.

Another object of this invention is to provide improved methods of construction of masonry walls, foundations, slabs, and cast-in-place structures.

Further objects and advantages of the present invention will become apparent from a consideration of the drawings and ensuing description.

DETAILED DESCRIPTION OF THE INVENTION

Figure 1:
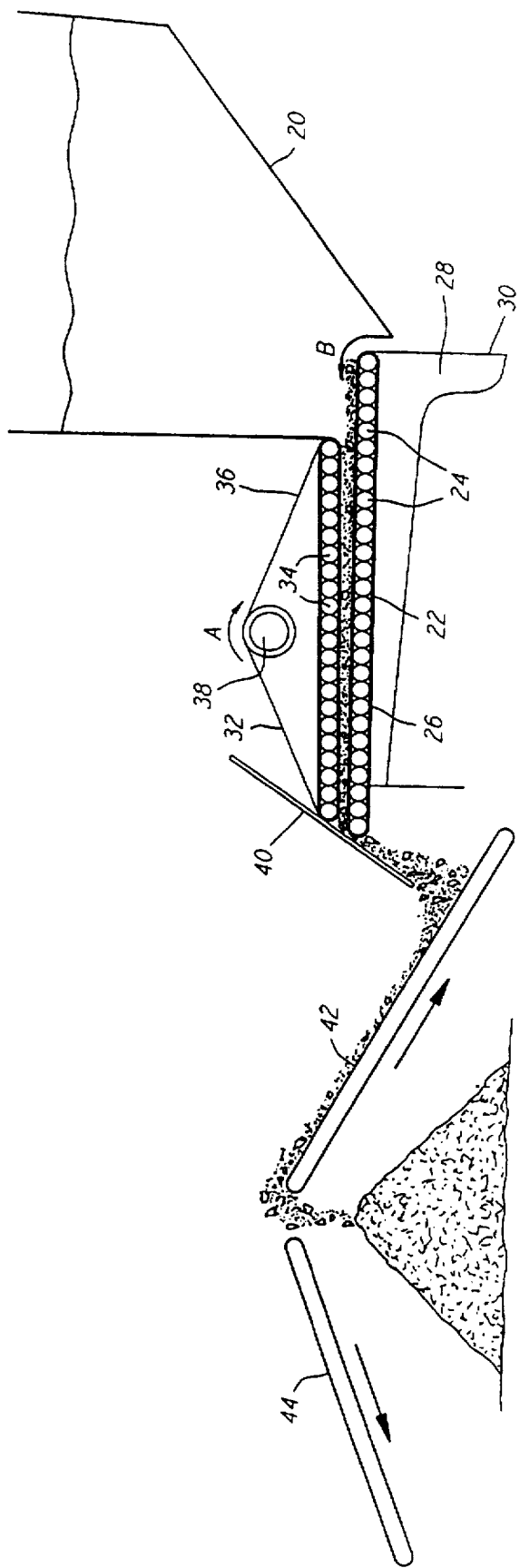
FIG. 1 is an illustration of a conveyor/extractor/crumbler apparatus.

A lightweight building material comprises a mixture of a cellulose fiber component with cement, fly ash, and water to form a building material having the appearance and many of the material properties of concrete but having a lighter weight and higher thermal resistance. The lightweight building material also possesses many of the construction properties of wood. The foregoing material properties make the material suitable for use in above grade residential and commercial construction, in particular the construction of structural elements, walls, floors, ceilings, roof panels, and the like. This material is also suitable for use in the production of non-structural architectural items and castings such as moldings, trims, panels, doors, decorative trusses, timbers, and the like.

In a preferred form, a lightweight building material in accordance with the present invention comprises a mixture having the following composition by weight:

66–89.5% portland type I/II cement;
0–23% fly ash; and
5.8–11.5% cellulose fiber.

The above mixture is in dry form and is to be mixed with water to form a pourable slurry, similar to standard concrete in its plastic form. The material is preferably mixed in a ratio of 10 gallons of water per 68 pounds of the above mixture of components to obtain a suitable pourable slurry. This combination will produce roughly 2¼ cubic feet of building material.

The mixing procedure entails mixing the water and cellulose fiber first, followed by addition of the cement and fly ash. The four components are then mixed for at least five minutes. The resultant mixture is in plastic form, similar in form to standard concrete, and suitable for pouring into a mold or form structure.

The cellulose fiber used in the preferred embodiment comprises recycled paper that is mechanically shredded and shaved into a dry lint-like cellulose fiber. Cellulose fiber used in the preferred embodiment of the lightweight building material of the present invention is processed and sold by Cal-Fiber Co. of Los Angeles, Calif. While standard newspaper is used in the preferred embodiment, tests indicate that any recyclable waste paper product can be suitably processed for use as the cellulose fiber component of the mixture comprising the lightweight building material of the present invention.

Alternatively, the cellulose fiber used in the lightweight building material may comprise a wet pulp form of recycled paper. Wet pulp processing/recycling is used in other paper pulp processes and can be readily adapted to provide recycled paper in wet pulp form suitable for use as the cellulose fiber component of the lightweight building material.

Further, though the use of recycled waste paper as the source of cellulose fiber has obvious environmental advantages, non-recycled or virgin cellulose pulps are also suitable for use in the lightweight building material.

The range of compositions by weight described above for the components of the lightweight building material corresponds to a range of desired material properties of the end product. In particular, the following material properties are observed as the composition is changed within the limits set forth above:

1. Weight. Because cellulose fiber is relatively low in weight as compared with cement or fly ash, as the amount of cellulose fiber is reduced as a percentage of the overall mixture, the building material obtained as a finished product will be correspondingly heavier in weight. Conversely, because cement is heavier in weight as compared with any of the remaining components, as the amount of cement is reduced as a percentage of the overall mixture, the building material obtained as a finished product will be correspondingly lighter in weight.

2. Strength. The amount of the cement component in the mixture corresponds most directly with the overall strength of the finished product. Accordingly, as the amount of cement is increased as a percentage of the overall mixture, the finished product will be correspondingly stronger.

3. Thermal Properties. The ratio of cellulose fiber to cement as percentages of the overall mixture corresponds to the thermal properties in the resulting material. As the amount of cellulose fiber is decreased as a percentage of the overall mixture, the thermal properties of the finished material will more closely resemble those of standard concrete. Conversely, where the cellulose fiber component of the material is increased, the finished material will possess higher thermal resistance.

4. Cost. The cement component of the mixture is generally the more costly, while fly ash is a cementitious material that is less expensive than cement. Accordingly, as the amount of cement is increased as a percentage of the overall mixture there is a resultant increase in the cost of the material.

Accordingly, one practicing the present invention may alter the initial composition of the mixture comprising the lightweight building material, within the range of compositions described above, to achieve desired results. If a heavier, stronger structural unit is preferred, the fly ash component is reduced or eliminated and/or the amount of cement in the initial composition is increased. Conversely, if a lighter structure having increased thermal resistance is preferred, the cement component is reduced. A finished product having intermediate properties is achieved through use of a building material having a composition of about 73.5% cement, 17.7% fly ash, and 8.8% cellulose fiber.

In addition to the components described above, additional reinforcing fibers may be added to the building material, including, but not limited to, steel, polyester, and nylon. Other additives could possibly include sand, adobe-like earths and clays, and other cementitious materials. Those skilled in the art will recognize that all of these additives are standard in the concrete industry and are helpful in achieving specific results, as are other and further materials not listed here. The use of these additives in the lightweight building material of the present invention is identical to their use in standard concrete mixing with similar results as well.

While in its plastic state, the material has the appearance and properties of standard concrete or cement mortar. The material can be formed and poured into any shape and utilizes the same equipment to mix, transport, pump and finish as standard concrete or mortar. Once cured, the material has the appearance of standard concrete but differs from concrete in strength, thermal resistance, and weight. The cellulose fiber component of the material gives the material less strength relative to standard concrete, but renders the material more thermally resistant than standard concrete. Moreover, a given volume of the lightweight building material in cured form and in the composition of the preferred embodiment weighs approximately 40% to 50% of the same volume of standard cured concrete.

The cured material, unlike standard concrete, is capable of being sanded, chiseled, drilled, sawed, nailed and bolted in a manner similar to like operations with wood. It does not burn and is not subject to dry-rot, decay, or infestation by termites. The material is therefore easily finished by simply painting, using some other wall coating, or otherwise providing some type of finish to the surface of the finished structural unit. Because of these properties, the material is suitable for use in construction of walls, ceilings and floors and other above-grade structures.

The lightweight building material of the present invention is also suitable for use in the production of objects in pre-cast form, such as block form. Blocks constructed of the material are identical in size and similar in appearance to standard concrete blocks but have the preferred material characteristics of the lightweight building material. The following processes utilize the lightweight building material of the present invention in the manufacture of a lightweight aggregate material for use in the manufacture of construction blocks using existing block manufacturing equipment and technology.

Turning now to FIG. 1, a conveyor/extractor/crumbler apparatus comprises a hopper 20 which feeds onto a lower conveyor belt assembly 22. The lower conveyor belt assembly 22 includes a first plurality of pinch rollers 24 arranged in a row, around which is snugly attached a lower conveyor belt 26 of strong poly-netting. The lower conveyor belt 26 is tensioned around the first plurality of pinch rollers 24 and is able to spin freely. A drip pan 28 having a drain 30 is placed below the lower conveyor belt assembly 22. An upper conveyor belt assembly 32 is positioned above the lower conveyor belt assembly 22 and includes a second plurality of pinch rollers 34 arranged in a row, around which is snugly attached an upper conveyor belt 36 of standard belt material. The upper conveyor belt assembly 32 is angled such that the space between the upper conveyor belt assembly 32 and the lower conveyor belt assembly 22 is relatively large at the end nearest the hopper 20, and gradually narrows such that the space is relatively small at the other end of the upper and lower conveyor belt assemblies.

A drive mechanism 38 is attached to the upper conveyor belt 36 and is capable of driving the upper conveyor belt 36 around the second plurality of pinch rollers 34. The drive mechanism 38 comprises, for example, an electric motor having sufficient power to drive the upper conveyor belt 36.

A crumbler device 40 is positioned at the ends of the upper and lower conveyor belt assemblies opposite the hopper 20. The crumbler device 40 comprises, for example, a lump breaker well known in the excavation and mining industries. A lump breaker comprises a set of blades moving at high speeds which are capable of breaking down large "lumps" of material into smaller particles. A damp aggregate conveyor 42 is positioned below the crumbler device 40 in order to catch the lightweight aggregate material as it exits the crumbler device 40. Similarly, a dry aggregate conveyor 44 is positioned opposite the damp aggregate conveyor 42. The damp aggregate conveyor 42 and dry aggregate conveyor 44 each comprise a standard conveyor belt.

The apparatus described above is used to manufacture the lightweight aggregate material according to the following process. First, the components of the lightweight building material are mixed together in a mixture as described above. The mixture is loaded into the hopper 20 located at the rear of the apparatus. The hopper 20 gravity feeds the mixture onto the lower conveyor belt 26, while the upper conveyor belt 36 moves in the direction of the arrows A, shown in FIG. 1, by the force of the drive mechanism 38. The motion of the upper conveyor belt 36 draws the mixture into the apparatus, and the friction of the mix against the lower conveyor belt 26 causes the lower conveyor belt to move in the direction of the arrows B of FIG. 1. As the mixture is compressed between the upper and lower conveyor belts, excess water in the mixture is compressed out and is collected in the drip pan 28. Water collected in the drip pan 28 is removed through the drain 30, and is recycled for use in the next batch of lightweight building material loaded into the hopper 20.

The compressed mixture forced through the end of the conveyor belts of the conveyor/extractor/crumbler apparatus is in the form of a relatively dry cake substance. The cake substance is then run through the crumbler device 40 which breaks the cake into pellet-like pieces of varying sizes and gradations. The sizes of the pellet-like pieces vary according to the extent of the breakage achieved in the crumbler device 40, but will typically range from ½" in diameter down to approximately # 30 grit sand like pieces.

The pellets are moved by the damp aggregate conveyor 42 to a location to allow for curing. Curing is facilitated by mixing the newly processed pellets with a substantial volume of previously cured, dry pellets by continuously loading dry pellets on the dry aggregate conveyor 44. The dry aggregate conveyor 44 then unloads the dry pellets at the same point that damp pellets are unloaded from the damp aggregate conveyor 42. The mixed pellets are also occasionally moved or stirred to help prevent sticking if needed.

An alternative method of manufacturing the lightweight aggregate material comprises a process whereby a quantity of previously cured aggregate material is mixed with a smaller quantity of material in wet pulp form. Through mixing the previously cured aggregate with the wet pulp, the wet pulp is broken down into pieces approximately equal in size to the previously cured aggregate. The breaking down of the wet pulp is caused by the absorption of a portion of the moisture from the wet pulp by the cured aggregate combined with agitation by a mixing device. The alternative method is described below in reference to FIG. 11.

Figure 11:
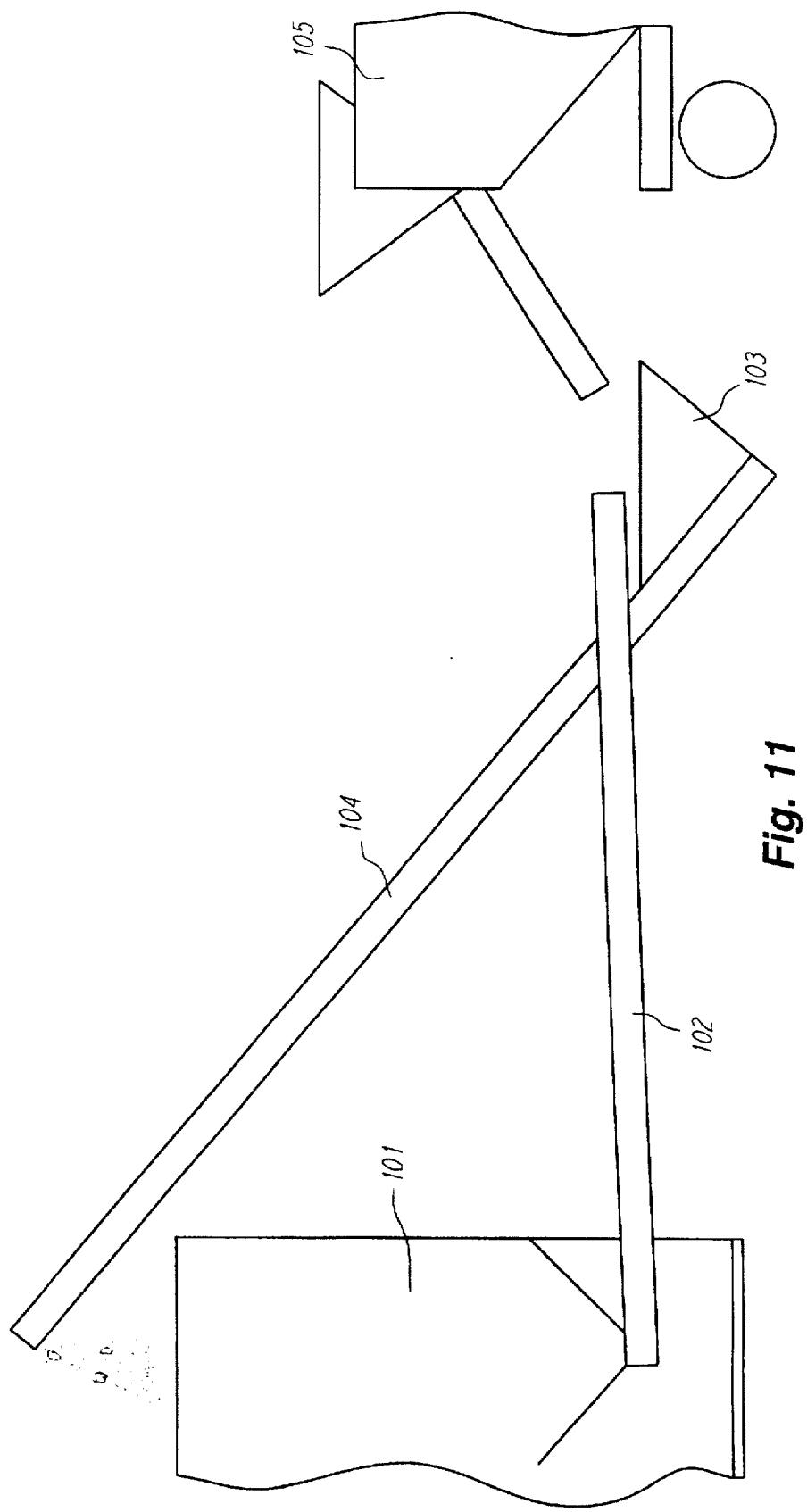
FIG. 11 is an illustration of an apparatus used in the production of a lightweight aggregate material.

Turning now to FIG. 11, an alternative apparatus used in the production of the lightweight aggregate is illustrated. The apparatus comprises a silo 101, or some other suitable storage container, which feeds onto a screw conveyor 102, a first end of which is located at the bottom of the silo 101. A second end of the screw conveyor 102 feeds a mixing hopper 103. A mixing screw conveyor 104 is adapted to be fed from the hopper 103 and to discharge into the top of the silo 101.

The apparatus of FIG. 11 is used to manufacture the lightweight aggregate material according to the following process. First, the silo 101 is filled to two-thirds to three-quarters full of cured lightweight aggregate material. A portion of the cured lightweight aggregate material is then transferred from the silo 101 to the mixing hopper 103 by the screw conveyor 102. Next, in a separate mixing device such as, for example, a standard concrete truck 105 or any other suitable mixing device, the components of the lightweight building material are mixed together in a mixture as described above to obtain a wet pulp form. One part of the wet pulp to three or more parts cured lightweight aggregate material is added to the hopper 103. The wet pulp can be discharged into the hopper 103 directly from the concrete truck 105 or other mixing device as shown in FIG. 11, or it can be transferred to the hopper 103 in any suitable manner.

The wet pulp/cured aggregate mixture is then mixed together by the mixing screw 104 while being transported up the mixing screw 104 to be discharged into the silo 101. It has been found that as the wet pulp mixes with the previously cured aggregate material, the cured aggregate absorbs a sufficient amount of water from the wet pulp to cause the wet pulp to crumble under the mixing action of the mixing screw 104. The output that is discharged into the silo 101 is a damp lightweight aggregate material of uniform size and proper gradation. Care must be given to keep the batch in slight motion so as to prevent clumping during the initial curing period of a day or so. This can be accomplished by breaking up any clumps accumulating in the silo 101 with an auger (not shown) or other suitable device. Any given quantity of wet pulp batched in one day can be batched out of the silo 101 as cured lightweight aggregate material the next day through the screw conveyor 102 to a discharge conveyor (not shown), thereby readying the apparatus to batch in more wet pulp and repeat the process.

As an alternative to using the silo 101 and the bottom return screw conveyor 102, the cured aggregate may be stored and transferred to the mixing hopper 103 by other means. For example, a skip loader (not shown) or other material transporting device can be used to load the cured aggregate into the mixing hopper 103. Other and further conveying systems could alternatively be used. In such systems, the cured aggregate may be stored in any suitable storage container or may simply be stored in a pile on the ground. Clumping of the curing aggregate can be prevented by simply breaking up the clumps by moving portions of the pile with a skip loader.

Once cured, the pellets produced by either of the foregoing processes comprise a lightweight aggregate material for use in production of lightweight construction blocks. The lightweight aggregate material is used with standard block manufacturing equipment in an identical manner to that of conventional aggregate materials in conventional block manufacturing processes. A conventional block manufacturing process comprises mixing an aggregate material with sand, cement, admixtures, and water sufficient to hydrate the cement. The mixture is then placed in a hydraulic press/mold which holds the mixture in the desired shape under pressure for a time sufficient to bind the components together into block form. The block is then allowed to cure.

Those skilled in the art will appreciate that the composition of the aggregate, sand, cement, admixture and water mixture, and the length of time during which the mixture is held under pressure will vary, as this process is routinely performed based on estimated volumes and times.

The lightweight construction blocks manufactured using the above process and the above-described lightweight aggregate material have similar material properties to those described above for the lightweight building material that makes up the lightweight aggregate material used in the manufacture of the blocks. The blocks are therefore capable of being sanded, chiseled, drilled, sawed, nailed and bolted in a manner similar to like operations with wood. These properties give the blocks of the present invention several advantages over construction blocks composed of concrete as in the prior art. For example, door jambs, windows, cabinetry, moldings, trims, casings, and the like can be directly affixed, with no special backing requirements, to walls constructed of construction blocks manufactured using the lightweight aggregate material described above. Also, construction blocks manufactured according to the conventional block manufacturing process using the lightweight aggregate material weigh approximately 30% less than standard weight concrete construction blocks.

A separate process of wet casting the lightweight building material may be utilized to make both structural and non-structural building components. Wet casting processes using pre-constructed form/molds can be used to manufacture, for example, reinforced, decorative timbers and trusses; wall, upper floor, ceiling and roof panels; non-structural moldings, trims, arches, doors, door and window surrounds, curves, alcoves, bay windows, and other items utilized in finish construction. The lightweight building material may also be utilized to cast non-construction related objects, statuary, prototype molds and objects, models and the like.

It is therefore understood that the lightweight building material and construction blocks described above will have several desirable capabilities for use in construction of walls, upper floors, ceilings, and roof panels in residential and commercial structures. The cured material possesses thermal properties preferable to those of both wood and concrete, and is also lighter in weight than concrete. The material is also capable of being shaped, cut and affixed to other materials in a manner similar to wood.

A method of construction of masonry structures will now be described. The method of construction of masonry structures is particularly adapted for use with construction block manufactured with the foregoing lightweight aggregate material and utilizes a wall layout and foundation forming jig described below.

Figure 12:
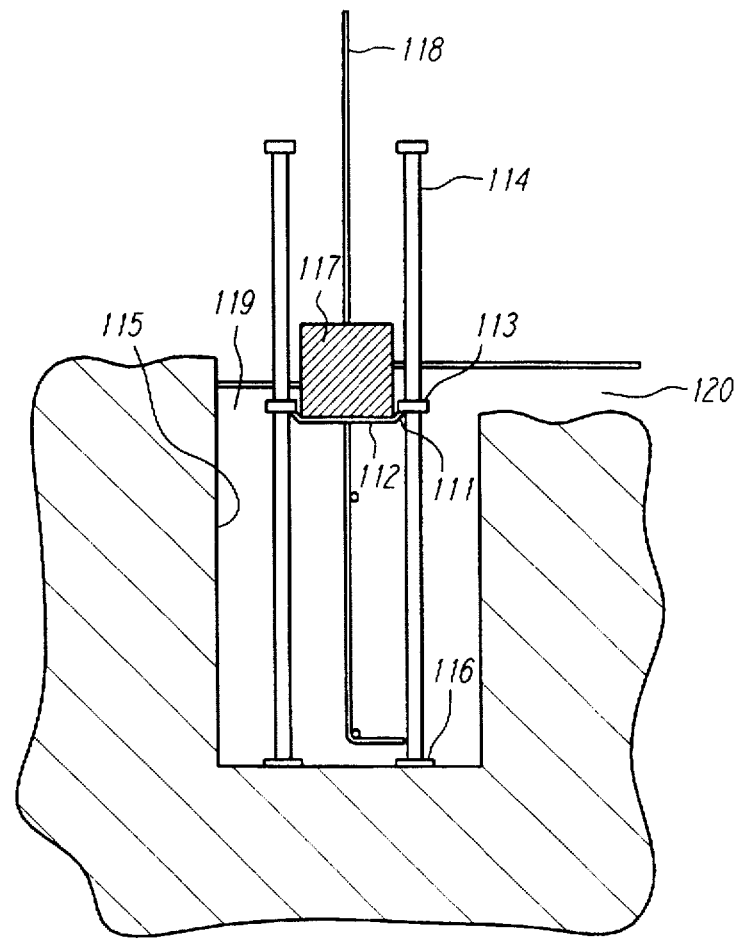
FIG. 12 is a cross-sectional end view of a masonry foundation jig.
Figure 13:
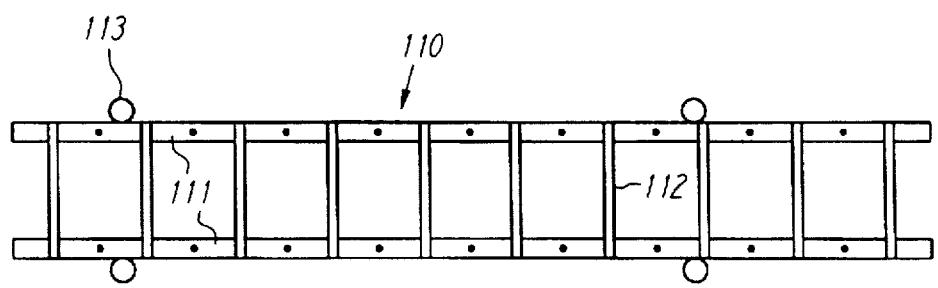
FIG. 13 is a top view of a rail apparatus of the masonry foundation jig of FIG. 12.

Turning now to FIGS. 12 and 13, an adjustable masonry wall and foundation jig for use in monolithic footing and slab construction is shown. The jig comprises a rail apparatus 110 having two light steel angles 111 held in a parallel spaced apart relationship by a plurality of spacers 112. The spacers 112 are also constructed of lightweight steel and are tack welded to the steel angles 111. The spacing between the pair of steel angles 111 is sufficient to accommodate a course of construction blocks 117, as will be more fully discussed below. A plurality of leveling nuts 113 are also tack welded to the exterior of each of the steel angles 111 at regular intervals to provide the capability of supporting the jig above the bottom of the trench, as more fully described below.

As best shown in FIG. 12, a screw stake 114 is screwed through each of the plurality of leveling nuts 113 and extends to the bottom of a footing trench 115 to thereby act as a support supporting the steel angles 111 above the footing trench 115. Each screw stake 114 comprises a rod threaded over its entire length to mate with the female threads of the leveling nuts 113. To prevent the screw stakes 114 from digging into the ground at the bottom of the footing trench 115, a steel dobie 116 is placed at the bottom of the trench beneath the end of each screw stake 114. Each steel dobie 116 comprises a small piece of light gauge steel plate, approximately 3" square and ⅛" thick, having a standard round cut washer tack welded to the top surface. The end of the screw stake 114 rests on the top surface of the dobie 116 inside the cut washer, thereby preventing the screw stake 114 from spinning off the dobie 116.

Also shown in FIG. 12, a course of construction blocks 117 is placed on top of the rail apparatus 110, i.e., on top of the steel angles 111 and spacers 112 and between the screw stakes 114. The construction blocks 117 may comprise standard concrete construction blocks or, advantageously, construction blocks produced by the processes described above with the lightweight building material.

A process for monolithic footing and slab construction will now be described. First, a building site is prepared by grading and trenching in a conventional manner. Next, the rail apparatus 110 is placed in the bottom of the footing trench 115. The rail apparatus 110 can be placed in the footing trench 115 in pieces, the pieces connected together by small bolts or tack welding (not shown) once having been placed in the trench. Supplying the rail apparatus 110 in pieces achieves several obvious advantages in manufacturing and transporting the rail apparatus 110. For example, once the wall layout of the structure is determined, the rail apparatus 110 can be cut to match the layout. The pieces of the rail apparatus 110 comprise straight lengths, corners, tees, couplings, etc., sized to accommodate the construction block 117. The rail apparatus 110 can therefore be shop fabricated, labeled, bundled, and shipped to the job site ready for assembly.

Once assembled, the rail apparatus 110 is lifted and temporarily supported at or near the proper height above the footing trench. The rail apparatus 110 is temporarily supported by placing a number of temporary support sticks (not shown) perpendicularly across the trench, then laying the rail apparatus 110 on the top surfaces of the temporary support sticks. Alternatively, instead of initially placing the component parts of the rail apparatus 110 in the bottom of the footing trench, the component parts may be placed on the temporary support sticks and assembled in place, thereby eliminating the need to lift the rail apparatus 110 into position after assembly.

Next, the dobies 116 are placed and the screw stakes 114 are installed through the leveling nuts 113 with a drill motor that spins them into place. Once the screw stakes 114 are in place and supporting the rail apparatus 110, the temporary supports are removed and the course of construction blocks 117 is installed on top of the rail apparatus 110. The screw stakes 114 are then adjusted to achieve level throughout the jig. Next, the reinforcing steel 118, plumbing (not shown), electrical (not shown), etc. are installed up through the cells of the construction block 117. As described below, the reinforcing steel 118 may advantageously be full height, i.e., extending upward the full height of the wall to be constructed above the footing. With the jig in place and inspected, the foundation can be poured. The suspended course of construction block 117 acts as a form for the foundation and allows a monolithic footing 119 and slab 120 to be poured. Once the concrete is placed, the top of the blocks 117 is used as a screed support to level the interior slab. Once the concrete has taken its initial set, the screw stakes 114 are removed by simply unscrewing them with the drill motor. The screw stakes 114 can then be cleaned and reused.

After the floor slab has been finished and cured in a traditional manner, the foundation and slab is in condition for construction of block walls. Because the first course of block is already embedded in the foundation and slab, and has been levelled and fitted with the specified utilities prior to pouring the slab and foundation, subsequent courses of block to be built upon the first course are easily installed.

One method of constructing a block wall is by dry stacking. The dry stacking method may utilize standard concrete blocks or, advantageously, construction blocks comprising the lightweight building material described above. In the dry stacking method, full height reinforcing steel is embedded in the foundation constructed as above. The full height reinforcing steel extends upward the full height of the wall, and is threaded at its top end to enable a roof truss system to bolt directly to the reinforcing steel to provide support. Dry stacking comprises stacking construction block without mortar, the construction block being stacked such that the reinforcing steel runs through the cells of the blocks. The dry construction block is stacked to the desired elevation specified for the walls, taking into account window and door openings and the like.

Once the walls are dry stacked as above, concrete is poured from the top of the wall into the cells of the construction blocks, providing a fully grouted core of reinforced concrete. The concrete core of the walls thereby carries all of the structural load, and adds additional internal thermal mass behind any external insulation that may be subsequently affixed to the exterior surface of the wall.

The dry stacking method described above provides a number of advantages. Since the construction blocks are dry stacked, the cost and time of mortaring the blocks together is eliminated. Instead, the structural value of the wall is obtained from the concrete core. Additionally, the thermal mass of the fully grouted block wall is much greater than that of a wall that is periodically reinforced and grouted.

As an alternative to constructing walls of construction block, a foundation and slab constructed as above provides the capability of constructing a wood frame structure that uses the course of construction block embedded in the slab as a wall layout for the structure. In such a case, it is advantageous to set the course of construction block flush with the top surface of the floor slab.

The masonry wall and foundation jig and the method of construction described above provide the capability of taking unique advantage of the dimensioning power and precision of current computer aided design (CAD) programming and technology. Once a structure is created on CAD the exact dimensions of the wall layout are easily determined. By programming modular jig components, i.e., corners, tees, couplings, etc., in the needed locations, the remaining lengths of interconnecting straight pieces of the jig can be determined. A cut list of modular and pre-cut jigging components is then generated by the CAD program. These components may then be fabricated, labeled and bundled at a central shop location, then shipped to the job site for assembly. The field crew need only connect the pieces together in the proper order to create a precisely dimensioned, full scale wall layout and foundation forming system.

Turning now to FIGS. 2 through 10, a method of construction of cast-in-place structures particularly adapted for use with the foregoing lightweight building material utilizes a form apparatus comprising a set of forms suspended over a footing. Two preferred embodiments of a form apparatus suitable for use in the method of construction are described below.

Figure 2:
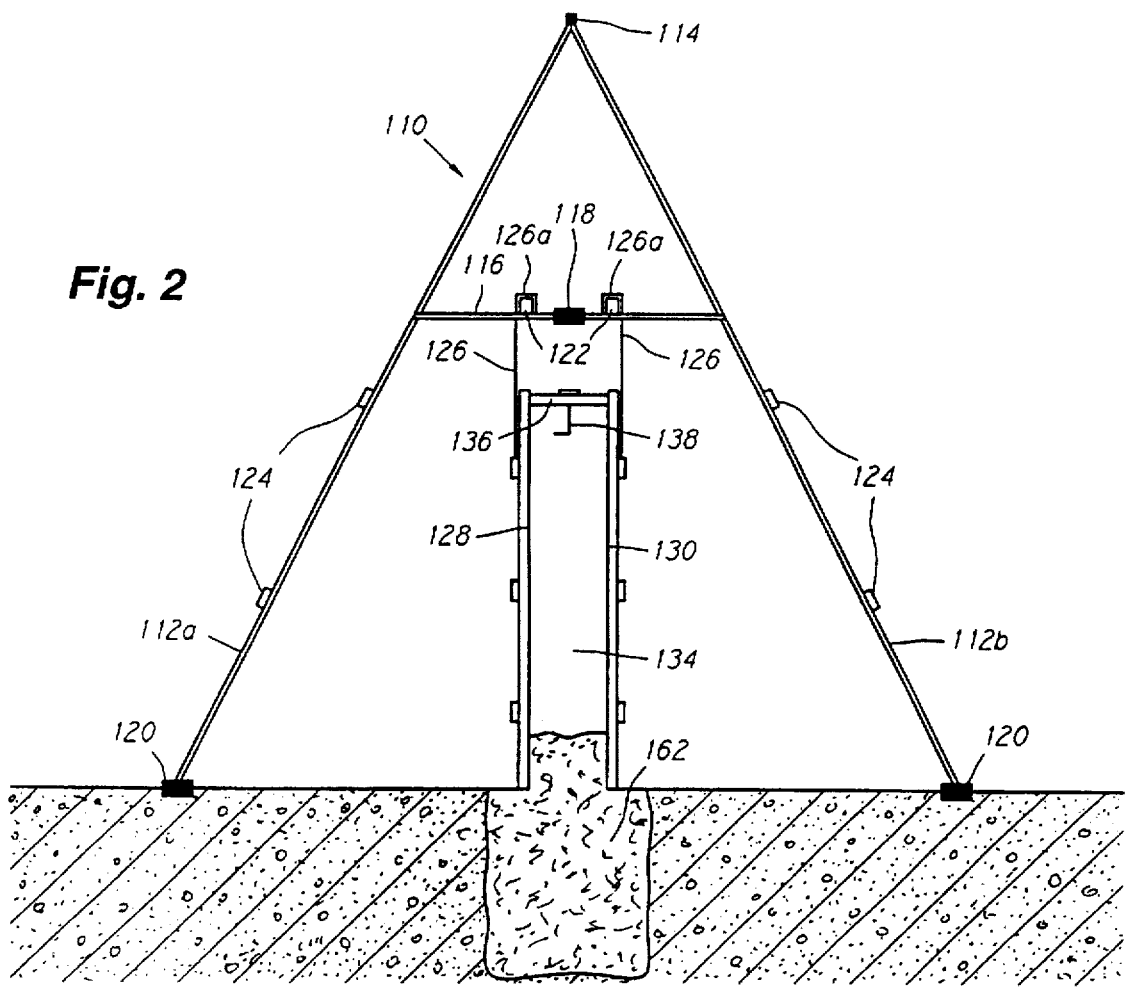
FIG. 2 is a cross-sectional end view of a construction apparatus.

Referring to FIG. 2, a cross-sectional end view illustrating a first preferred embodiment of a form apparatus used to practice the method of construction of the present invention is shown. There are multiple A-frames 110 each comprising two vertical poles 112a and 112b connected to each other at a first end of each pole by a pin 114. A top bar 116 is pivotably attached to each vertical pole 112a and 112b at an intermediate point nearer to the first end of each pole and provides support for the A-frame 110 when the A-frame 110 is in the extended position shown in FIG. 2. A hinge 118 of the top bar 116 provides the capability to fold up the A-frame 110 for storage or transportation. Adjustable feet 120 attached to the second end of each vertical pole 112a and 112b allow proper leveling of the A-frame 110 when it is in use, as will be more fully set forth below.

Figure 3:
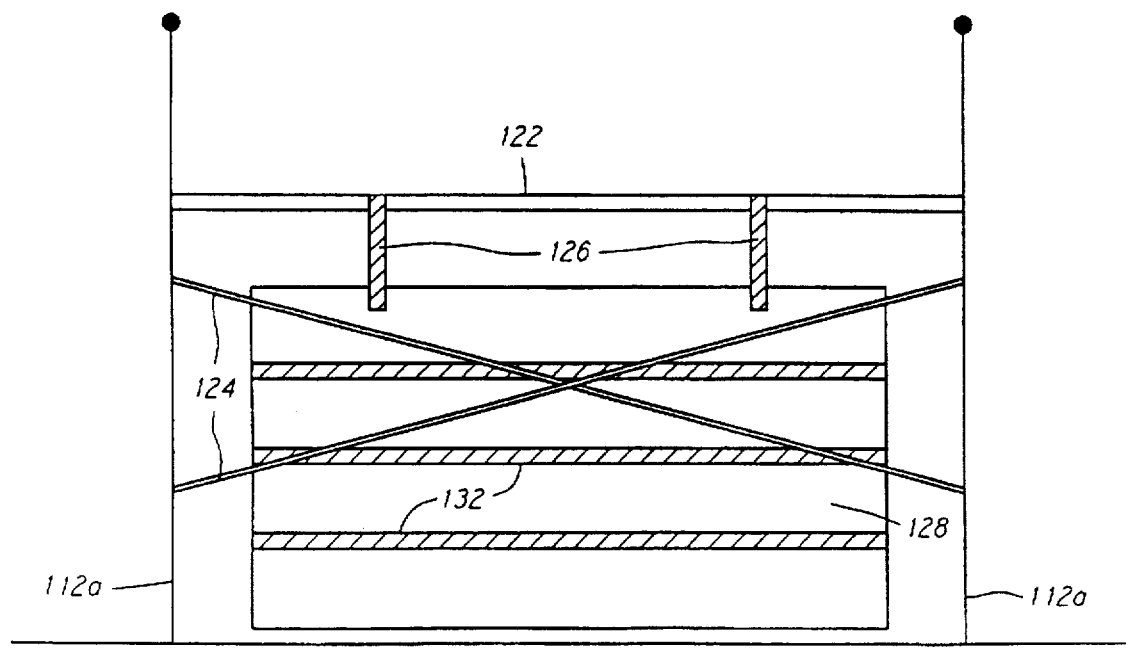
FIG. 3 is a side view of the apparatus of FIG. 1.

Referring to FIGS. 2 and 3, two top rails 122 are shown resting upon the upper side of the top bars 116. In FIG. 3, two A-frames 110 are shown, with the top rails 122 extending between the two and resting upon the upper side of the top bar 116 of each A-frame 110. The two A-frames 110 are identical and are further supported by two cross-braces 124 which are attached at each end to each respective A-frame 110. Similar cross-braces 124 are also attached on the opposite side of the A-frames 110 but are not visible in FIG. 3.

Once again referring to FIG. 3, two hangers 126 each rest at a first end upon the top rail 122 and attach at a second end to a form panel 128. The first end of each hanger 126 is in the shape of a hook 126a, as best shown in FIG. 2. The hooked end 126a of each hanger 126 is in a shape that allows it to wrap around the top rail 122 to provide support for the hanging form panel 128 attached to the second end of the hanger 126. Three walers 132 are also attached to the form panel 128 to provide stability to the form panel 128. Each waler 132 is attached to the form panel 128 such that the waler 132 extends parallel to the top rail 122 and perpendicular to the vertical poles 112a and 112b of the A-frame when the form panel 128 is in place. In the preferred embodiment, each form panel 128 will have three walers attached to it, one attached near the top of the form panel 128, one near the bottom, and one in the middle. However, it is possible to attach more or fewer walers 132 to provide more or less additional stability to the form panel 128, as the need requires.

The form panel 128 is constructed of corrugated aluminum, giving it strength and light weight. Those skilled in the art will appreciate that such a panel is much lighter than traditional aluminum form panels. The form panel 128 of the present apparatus can therefore be constructed in a much larger size while still remaining manageable in use.

FIG. 2 shows a cross-sectional end view illustrating both sides of the A-frame 110, and therefore shows two form panels, 128 and 130, between which a cast-in-place structure 134 is formed. The second form panel 130 is similar to the first and is connected to the top rail 122 by hangers 126 in a similar manner to that of the first form panel 128, as described above. A top plate 136 fits between the two form panels 128 and 130, and is attached to the cast-in-place structure 134 by an anchor bolt 138.

Figure 4:
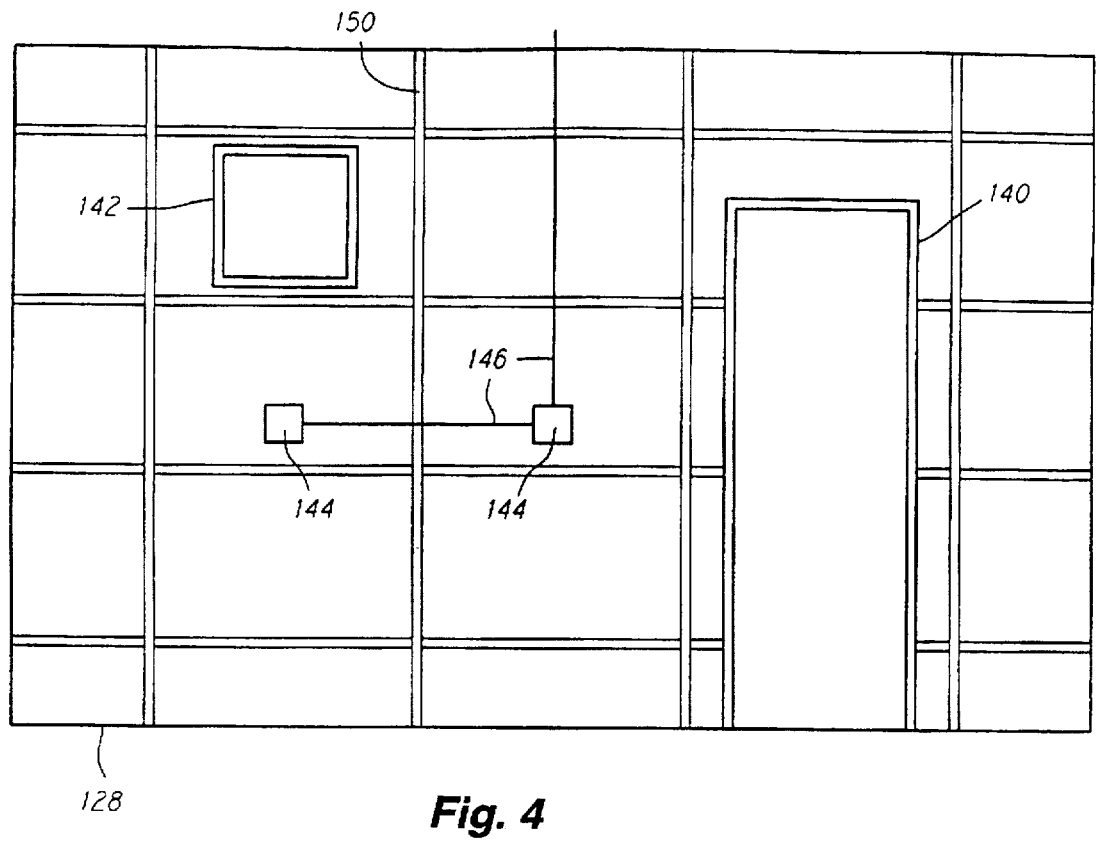
FIG. 4 is a side view illustrating a form used in the apparatus of FIGS. 1 and 2.

Referring to FIG. 4, a side view of the first form panel 128 is shown. A door block-out 140 can be detachably connected to the form panel 128 to fit between the first form panel 128 and the second form panel 130 when the form panels are hung from the top rails 122. Similarly, a window block-out 142 can also be connected to the form panel 128. The door block-out 140 and window block-out 142 comprise treated lumber and remain embedded in the cast-in-place structure 134 when the form panels are removed, as discussed below. The door block-out 140 and window block-out 142, therefore, act as a door frame and window frame, respectively, in a wall of the cast-in-place structure.

In a similar manner, electrical boxes 144 can also be detachably connected to the inside surface of the first form panel 128. The electrical boxes 144 are connected to each other by PVC conduit 146, with at least one line of PVC conduit 146 extending to the top of the form panel 128. The PVC conduit 146 carries the electrical wire between the electrical boxes 144, and to the top of the wall to provide access in the attic area of the structure. The electrical boxes 144 and PVC conduit 146 are detached from the form panel 128 and remain embedded in the cast-in-place structure 134 when the form panels 128 and 130 are removed from the cast-in-place structure 134.

Figure 5:
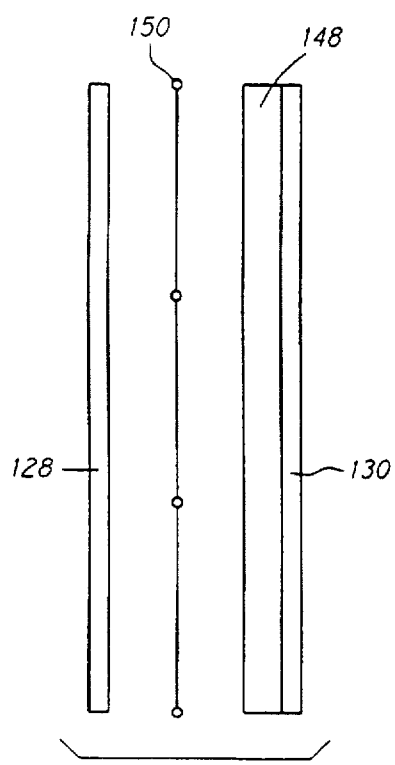
FIG. 5 is an end view illustrating portions of two forms and foam insulation utilized in the apparatus of FIGS. 1 and 2.

Referring now to FIG. 5, an insulation panel 148 is shown detachably pressed to the surface of the second form panel 130. An unfaced rigid urethane foam panel with an R-value of 7.5 per inch is used in the preferred embodiment. The insulation panel is cut in and around the doors, windows and electrical boxes and conduit and pressed flat against the form panel.

Steel reinforcing bars 150 are supported by the second form panel 130 and are hung between the two form panels 128 and 130. Number 4 steel re-bar at 18" on center both horizontal and vertical is the maximum used in the preferred embodiment, though alternate embodiments are possible. Welded wire mesh or a combination of mesh and re-bar are also suitable for use as a means to reinforce the structure and are used similarly. Those skilled in the art will appreciate that further stability is possible through the use of steel or polyester fibers in the building material mix.

Figure 6:
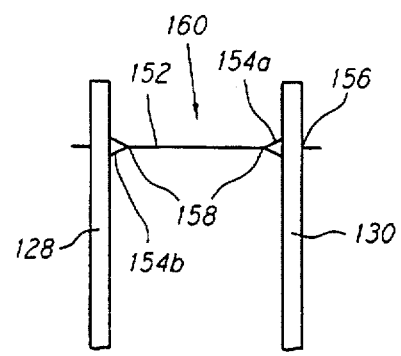
FIG. 6 is an end view illustrating portions of two forms and snap ties used in the apparatus of FIGS. 1 and 2.

FIG. 6 illustrates the two form panels 128 and 130 attached to each other by a snap tie. Snap ties are well known in the art, comprising a means for securing form panels in a uniformly spaced apart manner. The snap tie comprises a metal rod 152 having two cones 154a and 154b affixed thereon at a distance apart from each other corresponding to the space to be left between the two form panels 128 and 130. Each end of the metal rod 152 fits through a hole in the form panel (not shown) to extend through the form panel to the exterior surface of the panel. The cones 154a and 154b affixed to the rod 152 prevent the rod 152 from extending any further through each form panel and thereby maintain the form panels in a uniformly spaced relationship. A clip 156 is then affixed to the end of the rod 156 on the exterior of the panel 130 thereby attaching the form panel to the snap tie. The rod 152, cones 154a and 154b, and clips 156 together form a snap tie assembly 160. A plurality of snap tie assemblies are employed and spaced throughout the bodies of the two form panels to provide adequate support.

After the building material has been poured between the form panels and adequate curing time has been allowed, the clip 156 is removed from the end of the rod 152 of the snap tie. The form panels are then able to be removed from the cast-in-place structure, leaving the ends of the rod 152 extending out from the structure. These ends are snapped off by bending the end of the rod 152, which is facilitated by having an indentation 158 preformed in the rod 152. The central section of the rod 152 therefore remains embedded in the cast-in-place structure.

Figure 7:
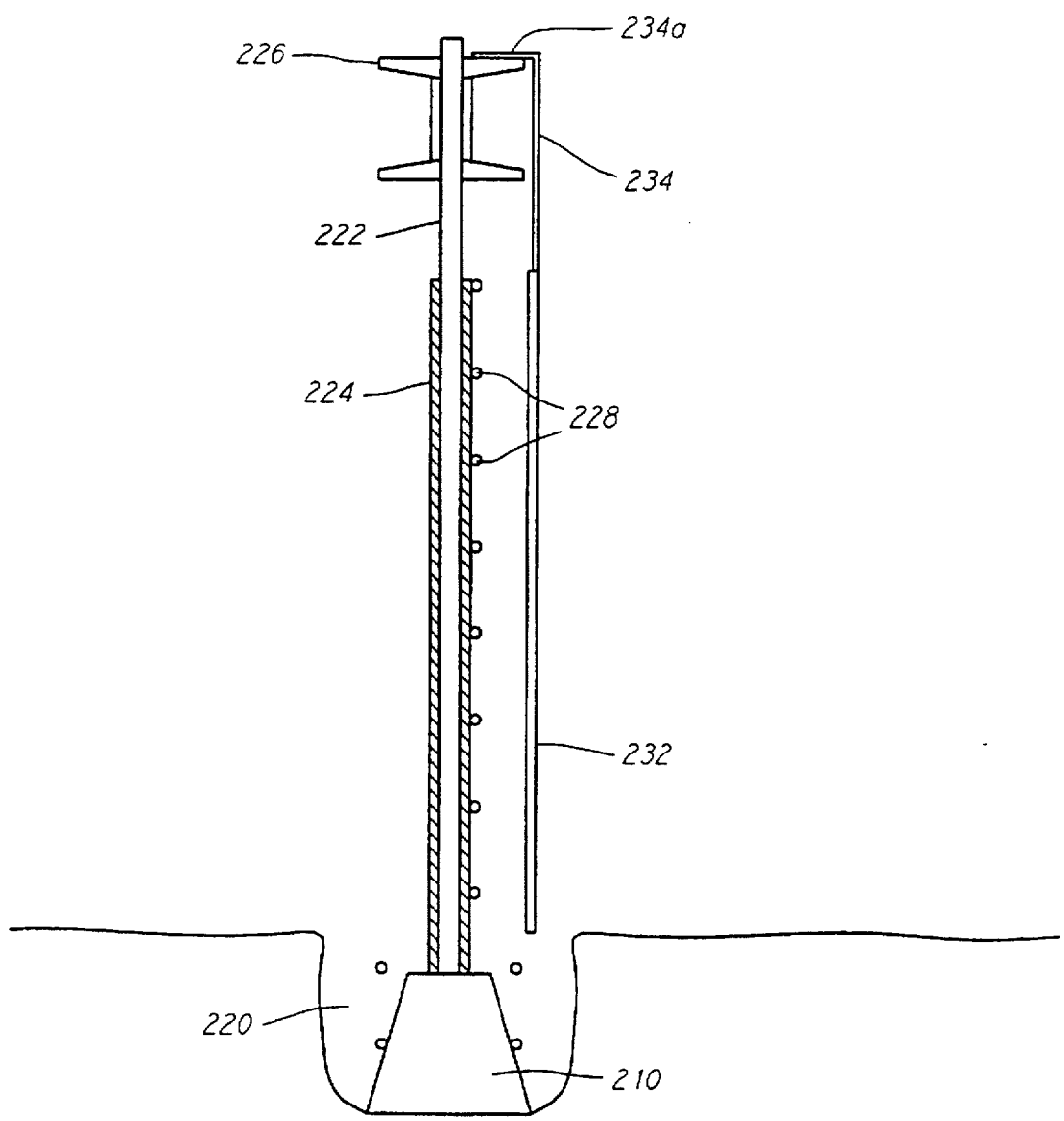
FIG. 7 is a cross-sectional end view of a portion of a construction apparatus.

Turning now to FIG. 7, a cross-sectional end view illustrating a second preferred embodiment of a form apparatus used to practice the method of construction of the present invention is shown. There are multiple support piers 210 each comprising a solid base having a cylindrical cavity formed therein. The support piers 210 are placed at spaced apart points within a footing 220 which is dug according to the plan of the structure to be formed. The precise spatial relationship between the support piers 210 is not critical, as will be more fully discussed below. A vertical post guide 222 is retained by a friction-fit within the cavity formed in the support pier 210 and extends upward from the support pier 210. A pipe removal sleeve 224 surrounds the vertical post guide 222 and rests against the top surface of the support pier 210. The vertical post guide 222 preferably comprises a metal pipe, while the pipe removal sleeve 224 preferably comprises a plastic pipe of larger diameter than the vertical post guide. The vertical post guide 222 is to be removed from the structure after construction and reused, while the pipe removal sleeve 224 remains embedded in the structure after construction. A modified top rail 226 is removably connected to the top of the vertical post guide 222.

Figure 8:
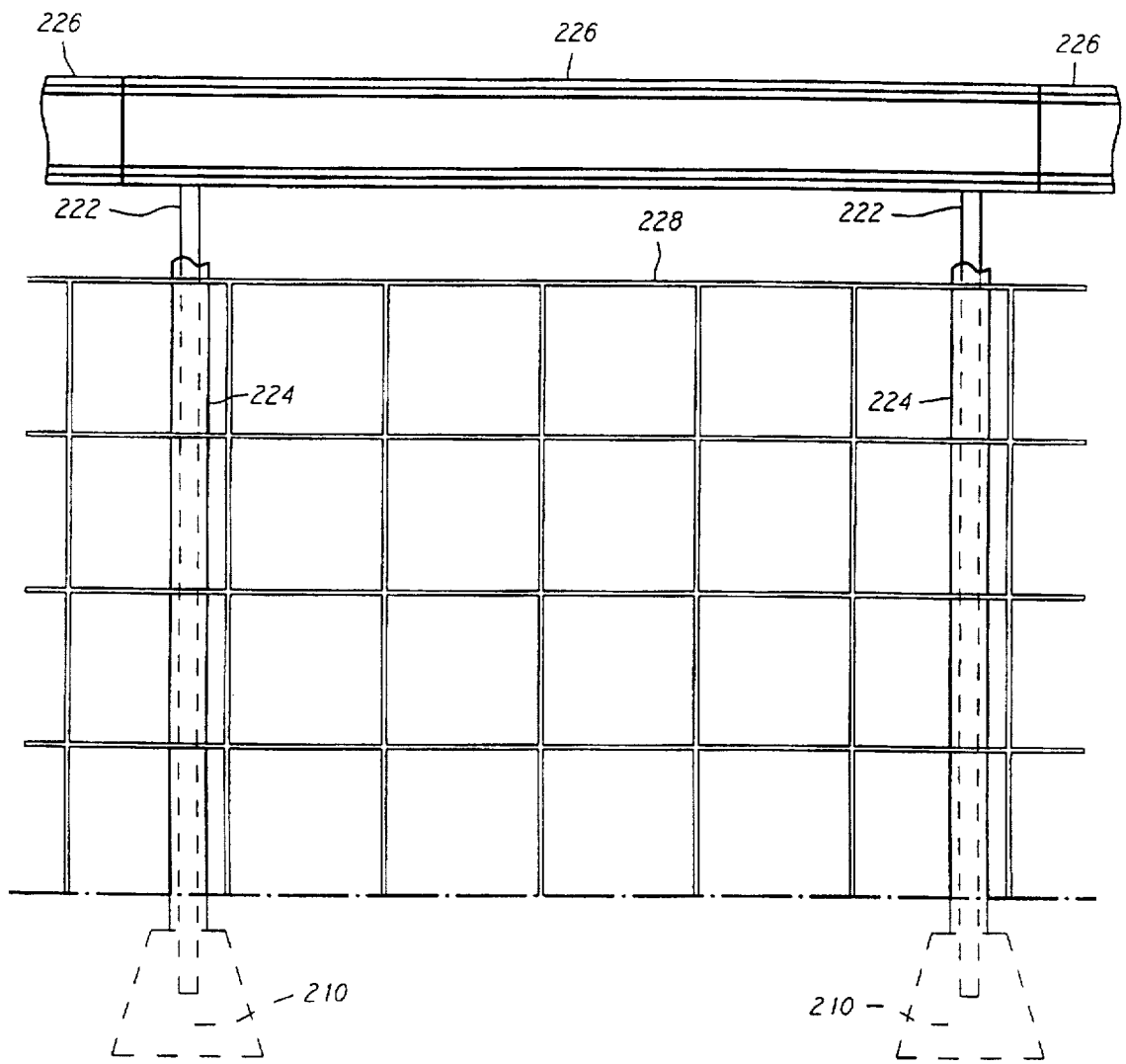
FIG. 8 is a side view of the apparatus of FIG. 7.

Turning now to FIG. 8, the top rail 226 extends in the same direction as and parallel with the footing 220 (not shown), in a plane above the footing 220, and is connected to another vertical post guide 222 in a similar fashion. The top rail 226 is also attached to another top rail 226 at each end of the first top rail 226. The other top rails 226 are also each attached to vertical post guides 222 and to other top rails 226 such that a top rail assembly is supported above the footing 220 by the multiple vertical post guides 222 retained in the multiple support piers 210. Thus, the relative spacing of the multiple support piers 210 within the footing 220 is dependent on the plan of the structure to be constructed and the need to support the top rail assembly. Support pier spacing is such that adequate support is provided to the suspended top rail assembly, without having an abundance of unneeded support pier/vertical post guide units. Reinforcing steel 228 is attached to and extends between the vertical post guides 222. The reinforcing steel 228 is thereby placed in position to be embedded within the structure after construction has been completed.

Figure 9:
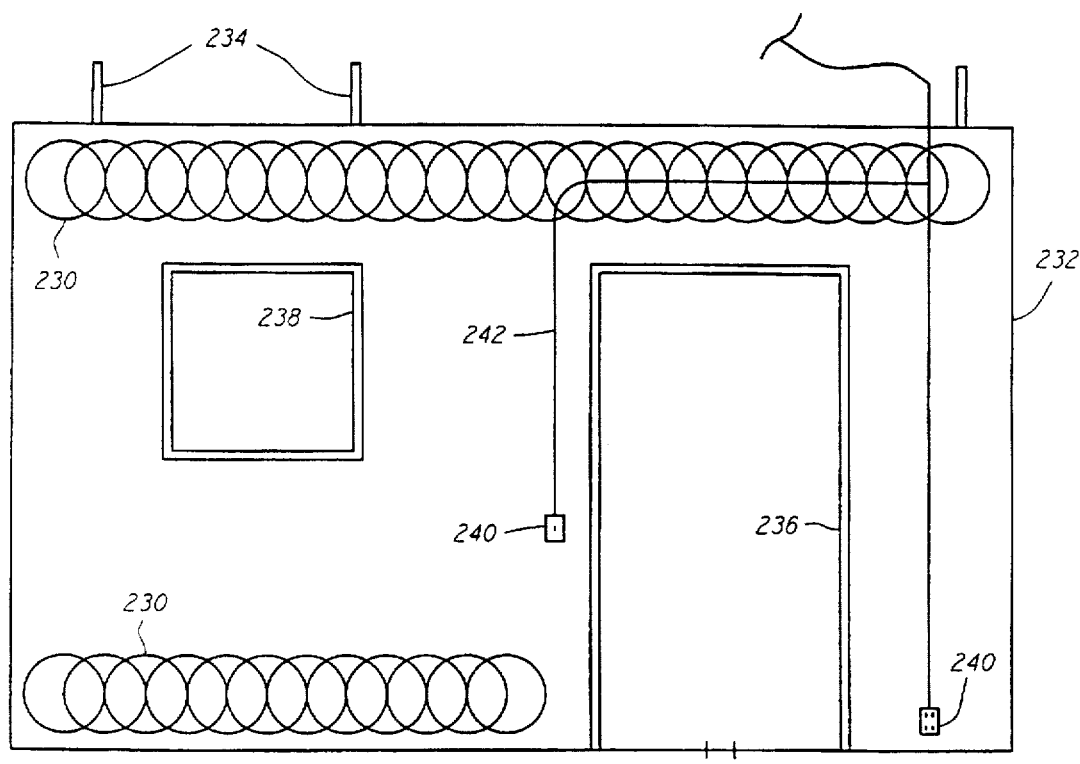
FIG. 9 is a side view illustrating a form used in the apparatus of FIGS. 7 and 8.

Turning now to FIG. 9, a side view of a first form panel 232 is shown. The first form panel 232 is substantially similar to the form panels 128 and 130 described above, having three hangers 234, a door block-out 236, a window block-out 238, electrical boxes 240 and PVC conduit 242. Also shown in FIG. 9 are thermal coils 230 attached to the first form panel. At least one lead from the thermal coils 230 is to extend underground to a sufficient depth to reach ground of a stable temperature. The thermal coils function either hydraulically or electromechanically in a manner well known in the art and act to stabilize the internal temperature of the structure to be constructed.

Figure 10:
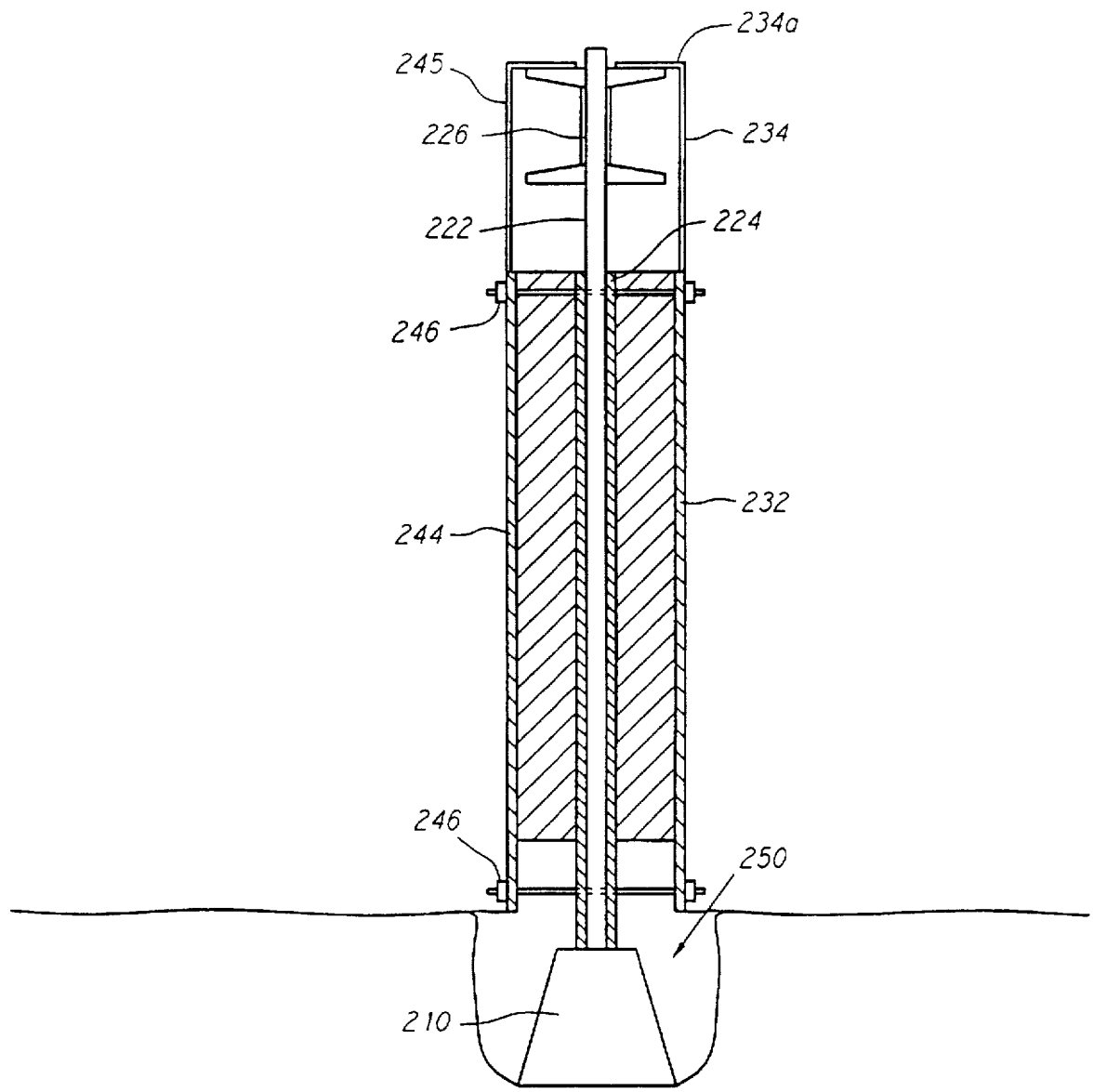
FIG. 10 is a cross-sectional end view of the apparatus of FIG. 7.

Turning now to FIG. 10, a hooked end 234a of each hanger 234 wraps around a section of the modified top rail 226 such that the first form panel 232 hangs from the top rail 226. A second form panel 244 hangs from a second side of the top rail 226 by hangers 245 wrapped around a section of the top rail 226. The second form panel 244 is connected to the first form panel 232 in a uniformly spaced apart relationship using snap tie assemblies 246 identical to the snap tie assemblies 160 discussed above. Horizontal walers (not shown) are also attached to the outside surfaces of each of the first form panel 232 and second form panel 244.

The construction method of the present invention utilizes a form apparatus such as either of those described above according to the following process. Reference is made to FIGS. 2 and 10 for the discussion of the process.

First, a footing is dug in a manner well known in the art in order to accommodate the pouring of the building material that makes up the footing. After the footings are dug, a form apparatus for use with the construction method, such as either of those described above, is erected. After erection, the form apparatus is in condition to be filled with the building material.

The filling process is accomplished by placing the material dispensing hose (not shown) in position to dispense into the space between the form panels from the top of the form panels. This is facilitated by constructing a row of scaffold planks to walk on and a top rail to help support the heavy dispensing hose. These structures are not shown in the drawings. The procedure generally requires three people: one at the end of the dispensing hose to guide the hose, one to hold a flashlight and help with the placement of the material and to vibrate the form panels when necessary to facilitate flow of the material, and a third on the ground to help move the dispensing hose as needed. The material is pumped in from the top of the form panels slowly and the form panels are vibrated occasionally to help the material flow evenly around and under the window and door block-outs.

The pouring process is accomplished in two stages. First, a standard concrete mixture is poured to fill the footings and to form a plug (indicated as 162 in FIG. 2 and as 250 in FIG. 10) from eight to twelve inches up the wall. A low slump concrete is used to prevent the material from boiling out of the footing. The plug 162 and 250 is allowed to set for one half to one hour, at which time the remainder of the cast-in-place structure is poured using the lightweight building material described above. By pouring the remainder of the cast-in-place structure within an hour of pouring the plug, the plug is not allowed to cure significantly and is still in a plastic state. Accordingly, the plug and the remainder of the poured structure comprise a monolithic structure having no cold joint.

Once the pour is complete, an anchored top plate of treated lumber is placed on top of the structure between the form panels. The structure is then left to cure. Once the structure has sufficiently cured, the form panels are removed by removing the clips of the snap ties and sliding off the panels, leaving the free-standing cast-in-place structure. The cast-in-place structure constructed using the above process using the lightweight building material of the present invention has all of the preferred material properties described above.

The method of construction of the present invention is uniquely suited for use with the lightweight building material of the present invention due to the relatively light weight of the material in comparison with standard concrete. However, with additional walers or some comparable additional support mechanism installed on a suitable form apparatus, the method of construction may utilize standard concrete as a building material. Through the use of a two stage pouring procedure and a suitable form apparatus, a monolithic cast-in-place structure is constructed through the suspension of a form apparatus over a footing.

While the invention is susceptible to various modifications and alternative embodiments, specific examples thereof have been shown by way of example in the drawings and are herein described in detail. It should be understood, however, that the invention is not to be limited to the particular embodiments or methods disclosed, but to the contrary, the invention is to cover all modifications, equivalents, and alternatives falling within the spirit and scope of the appended claims.

What is claimed is:

1. A method of manufacturing a lightweight aggregate material comprising the following steps:
   (a) providing a quantity of cured lightweight aggregate material,
   (b) providing a quantity of lightweight building material in a wet pulp form,
   (c) mixing said quantity of cured lightweight aggregate material with said quantity of lightweight building material, and (d) agitating the mixture obtained in step (c) to cause crumbling of the quantity of lightweight building material in wet pulp form.

2. The method of manufacturing a lightweight aggregate material of claim 1, further comprising the step of:

(e) providing slight motion to the mixture obtained in step (d) to prevent clumping of the lightweight aggregate material.

3. A method of manufacturing a lightweight aggregate material comprising the following steps:

(a) providing a first quantity of lightweight aggregate material, (b) transferring all or a portion of said quantity of lightweight aggregate material to a hopper, (c) adding a quantity of lightweight building material in a wet pulp form to the hopper to obtain a mixture, (d) transferring the mixture obtained in step (c) to a storage while mixing and agitating the mixture.

4. The method of manufacturing a lightweight aggregate material of claim 3, further comprising the step of:

(e) providing slight motion to the mixture to prevent clumping of the lightweight aggregate material.

* * * * *